(No Model.)
R. O. WOOD.
VEHICLE WHEEL.
No. 515,456.                    Patented Feb. 27, 1894.
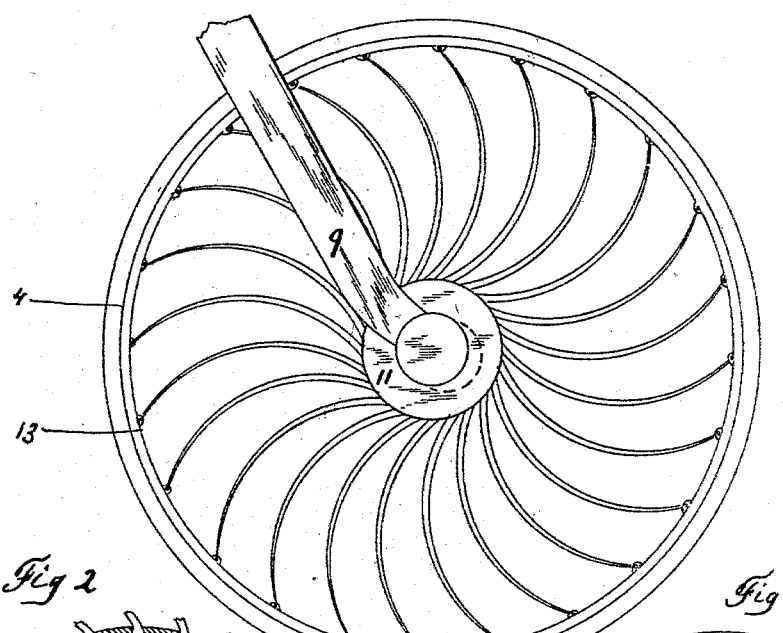
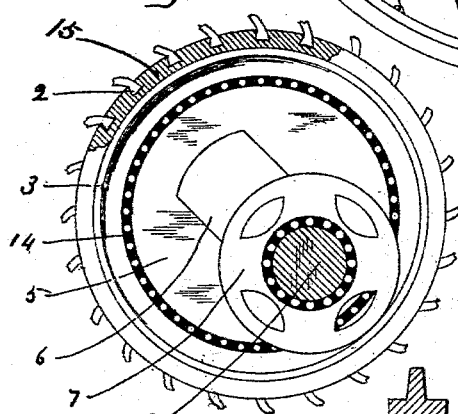
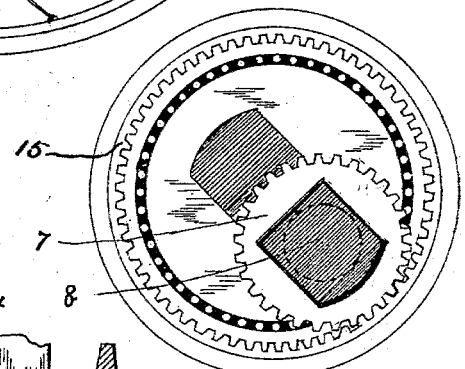
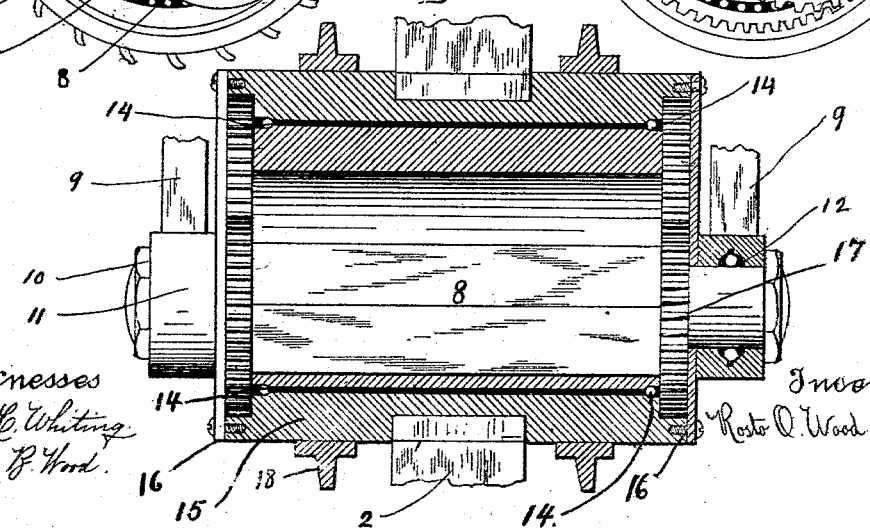
Witnesses
Allie C. Whiting
Mrs. J. B. Wood
Inventor
Rosto O. Wood

UNITED STATES PATENT OFFICE.

ROSTO ORRIN WOOD, OF WORCESTER, MASSACHUSETTS, ASSIGNOR, BY MESNE ASSIGNMENTS, TO JULIA B. WOOD, OF SAME PLACE.

VEHICLE-WHEEL.

SPECIFICATION forming part of Letters Patent No. 515,456, dated February 27, 1894.

Application filed August 3, 1891. Serial No. 401,455. (No model.)

*To all whom it may concern:*

Be it known that I, ROSTO ORRIN WOOD, of Worcester, county of Worcester, and State of Massachusetts, have invented certain new and useful Improvements in Vehicle-Wheels; and I declare the following specification, together with the accompanying drawings, to be a full, clear, and exact description of the same, in which—

Figure 1, is a plan view of a wheel as it will appear on a bicycle. Fig. 2, is an enlarged end view of the hub, with the cap removed showing the internal mechanism and showing externally a portion of the outer shell cut away and the method adopted for attaching the spokes to the hub. Fig. 3 represents a slight change in the shape of the friction wheel pivoted to the axle journal within the hub. Fig. 4, is a longitudinal sectional view of the hub, showing its internal arrangement.

My invention has for its object to produce a wheel whose speed will be greatly increased with less propulsive force applied, to secure flexible tension and ease to the rider, and to render it possible for repairs to spokes to be made with less time and expense, and it consists in its construction and arrangement of its various parts hereinafter described and specifically pointed out in the subjoined claims.

Similar figures refer to similar parts in the various figures.

My invention is shown as applied to a bicycle wheel, but the same may be easily understood to apply to other vehicles as well, with slight modifications, which will be seen without a detailed description or illustration.

4 (see Fig. 1) is the outer rim or felly of the wheel made concave on its outer surface to receive the rubber tire. This rim may be made stiff with the ends of spokes pivotally connected therewith as shown at 13, (see Fig. 1) or it may be made of sheet steel and tempered for purposes of elasticity of tension. The hub 15 (see Fig. 2) consists of a shell or outer rim which surrounds the axle-sleeve 5, the external surface of which is adapted to be used as an axle journal bearing, such as are in common use in connection with box bearings within an ordinary wheel hub, but for purposes of having less frictional contact between the inner surface of the hub and the axle-sleeve steel balls may be used as shown in Figs. 2 and 4 at 14. The axle-sleeve 5 is slotted at 6, through which the axle 8 passes where after being journaled it receives at each end thereof, a small friction wheel 7 whose external peripheral surface rests continually against the inner surface of the outer shell of the hub, as shown in Fig. 2. These friction wheels 7 may contain gear teeth as shown in Figs. 3 and 4, but preferably and for purposes of less friction, should be made with a smooth peripheral surface as shown in Fig. 2. Wheels 7 may be made to revolve on a plain journal but preferably with ball bearings as shown in Figs. 2 and 3.

The axle is squared or flattened centrally where it passes through the axle-sleeve till flush with the lateral surfaces thereof where both ends of said axle are journaled to receive friction wheels 7. 7. whose external peripheral surface constantly rests against the internal surface of the shell of the hub below a horizontal median line thereof, and at an angle of about forty five degrees as shown in Figs. 2 and 3, by which means the weight of the load or rider is continually pressing against the inner surface of the hub at that point, (shown by dotted lines in Fig. 1, also shown in Figs. 2 and 3) thereby furnishing additional propulsive force to move the vehicle forward, a valuable desideratum in aiding the rider in ascending a grade. The extreme ends of the axle are rigidly attached to the frame of the bicycle whereby the axle-sleeve, axle, and small friction wheels 7 are constantly held in the same position as shown in Figs. 1, 2 and 3 and for purposes above explained.

The squared portion of the axle is made to exactly fit the slot in the axle sleeve, so that there may be no lateral motion of the wheel when adjusted for use, and the axle will always be forward and beyond the center of the wheel within the hub to allow the friction wheel 7 to revolve when resting against the inner surface of the hub as shown in Fig. 2.

The spokes may be made of tempered sheet steel, of curved form, and made thinner, smaller, and more elastic near their connection with the rim or felly of the wheel. Other kinds of spokes or of other shaped steel rods may be used without materially departing from the spirit of my invention. By preference they are to be made dovetailed in form, and to fit a corresponding groove in the hub as shown at 2 in Fig. 2 and secured by means of a single bolt or set screw, as shown in Fig. 4 at 16. The other end of said spoke may be pivotally attached to the rim or felly of the wheel or in any other suitable manner. The sprocket wheel band or bands represented by 18 (see Fig. 4) over which the sprocket wheel chain passes may be attached to the external surface of the hub in any suitable manner but preferably by being screwed to place.

I am aware that combining the end of a spoke with the hub by means of its insertion into a dovetailed groove is old, also that of combining the other end of the spoke with the felly of the wheel by pivotally connecting it therewith is not new, and I do not claim either way of attaching the spoke to a wheel in the abstract, but by combining the two and securing it within the hub by means of a single set screw, will, by its simplicity of form, practicability of construction and rapidity of adjustment and removal, commend itself to the intelligence of every practical mechanic as a very simple combination and means of adjustment for strength and durability.

What I claim, and desire to secure by Letters Patent, is—

1. An axle-sleeve journaled on its external surface and provided internally with a slot, an axle squared or flattened centrally and made to fit said slot through which it passes, each end of said axle journaled to receive friction wheels whose peripheral surfaces rest against the inner surface of the box or hub as and for the purposes herein described and set forth.

2. In combination with the spokes and felly of a wheel, a hub, consisting of an outer shell, an axle-sleeve or frame work with an intermediate ball bearing journal between them, substantially as described, said axle-sleeve slotted centrally, an axle squared or flattened centrally and journaled at both ends, two small friction wheels pivotally attached to said axle, the whole operatively connected with each other, substantially as and for the purposes herein described.

3. In combination with the internal surface of the box of a wheel hub, an axle-sleeve journaled externally and adapted to fit the internal surface of a box of a wheel of ordinary construction, and provided internally with a slot substantially as described, an axle squared or flattened centrally, and made to fit said slot, said axle journaled at both ends to receive two friction wheels, whose peripheral surfaces rest against the inner surface of the hub, external to the lateral sides of said axle-sleeve, and inclosed within the hub as and for the purposes herein described.

4. In combination, the outer shell or hub of the wheel, an axle-sleeve provided with a journaled surface externally, and a slot internally, an axle whose surface is squared or flattened centrally and journaled at each end thereof, two friction wheels pivotally attached to said axle within the hub external to the lateral surfaces of said axle sleeve, and operatively connected with the inner surface of the outer shell of the hub, and the extreme ends of said axle operatively attached to the frame of a bicycle in such a manner as will constantly keep the axle-sleeve, and friction wheels in position substantially as and for the purpose herein described and illustrated.

5. In combination, tempered steel spokes pivotally attached to the rim or felly of the wheel, and attached to the hub by means of dovetailed depressions within the external surface of the hub, with the end of spokes prepared correspondingly to fit said depressions, and held in position by means of a single set screw substantially as described, the external shell of the hub and the axle sleeve with their intermediate ball bearings, said axle sleeve provided internally with a slot substantially as described, an axle squared or flattened centrally and made to fit said slot in axle sleeve, the ends of said axle journaled to receive two friction wheels the whole operatively connected with each other, and with the frame of the bicycle in such a manner as shall constantly hold the various elements and parts in position substantially as and for the purposes herein described and set forth.

In witness whereof I have hereunto subscribed my name in the presence of two witnesses.

ROSTO ORRIN WOOD.

Witnesses:
J. B. WOOD,
ROSE C. MITCHELL.